(12) United States Patent
Peng

(10) Patent No.: US 12,449,861 B2
(45) Date of Patent: Oct. 21, 2025

(54) DISPLAY CONTROL METHOD AND DEVICE, AND STORAGE MEDIUM

(71) Applicant: BEIJING XIAOMI MOBILE SOFTWARE CO., LTD., Beijing (CN)

(72) Inventor: Cong Peng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 392 days.

(21) Appl. No.: 18/087,808

(22) Filed: Dec. 22, 2022

(65) Prior Publication Data
US 2024/0094782 A1    Mar. 21, 2024

(30) Foreign Application Priority Data
Sep. 16, 2022    (CN) .......................... 202211130953.0

(51) Int. Cl.
*G06F 1/16*        (2006.01)
*G06F 3/041*       (2006.01)

(52) U.S. Cl.
CPC ............ *G06F 1/1677* (2013.01); *G06F 1/165* (2013.01); *G06F 1/1652* (2013.01); *G06F 3/04186* (2019.05)

(58) Field of Classification Search
CPC ..... G06F 1/1677; G06F 1/165; G06F 3/04186
See application file for complete search history.

(56) References Cited

U.S. PATENT DOCUMENTS

| 2017/0228091 A1* | 8/2017 | Ogita | G06F 3/04886 |
| 2021/0096885 A1* | 4/2021 | Klein | G06F 3/0481 |
| 2022/0398057 A1* | 12/2022 | Cheng | H04M 1/0243 |

FOREIGN PATENT DOCUMENTS

| KR | 20120092036 A | 8/2012 |
| KR | 20160080467 A | 7/2016 |

OTHER PUBLICATIONS

Korean Intellectual Property Office, "Request for the Submission of an Opinion" issues in Application No. 10-2022-0184618 dated Sep. 5, 2024, with English translation, (15p).
Search Report for EP Application No. 22216917.9 dated Aug. 22, 2023, (10p).

* cited by examiner

*Primary Examiner* — Myron Wyche
(74) *Attorney, Agent, or Firm* — Arch & Lake LLP; Hao Tan; Shen Wang

(57) ABSTRACT

A display control method is applied to a terminal, and includes: in response to that a first screen represented by the terminal in an unfolded state is lit, detecting whether a function display interface to be displayed is triggered to be displayed in the first screen, in which a display area of the function display interface is smaller than a display area of the first screen; in response to detecting that the function display interface to be displayed is triggered, acquiring touch data detected on a second screen and sensor data detected by a biological detection sensor; and determining a held position of the terminal according to the touch data and the sensor data, and controlling the function display interface to be displayed in a screen area of the first screen corresponding to the held position.

15 Claims, 5 Drawing Sheets in response to that a first screen represented by the terminal in an unfolded state is lit, it is detected whether a function display interface to be displayed is triggered to be displayed in the first screen, in which a display area of the function display interface is smaller than a display area of the first screen. — S11 in response to detecting that the function display interface to be displayed is triggered, touch data detected on a second screen and sensor data detected by a biological detection sensor are acquired — S12 a held position of the terminal is determined according to the touch data and the sensor data, and the function display interface is controlled to be displayed in a screen area of the first screen corresponding to the held position — S13

Fig. 1

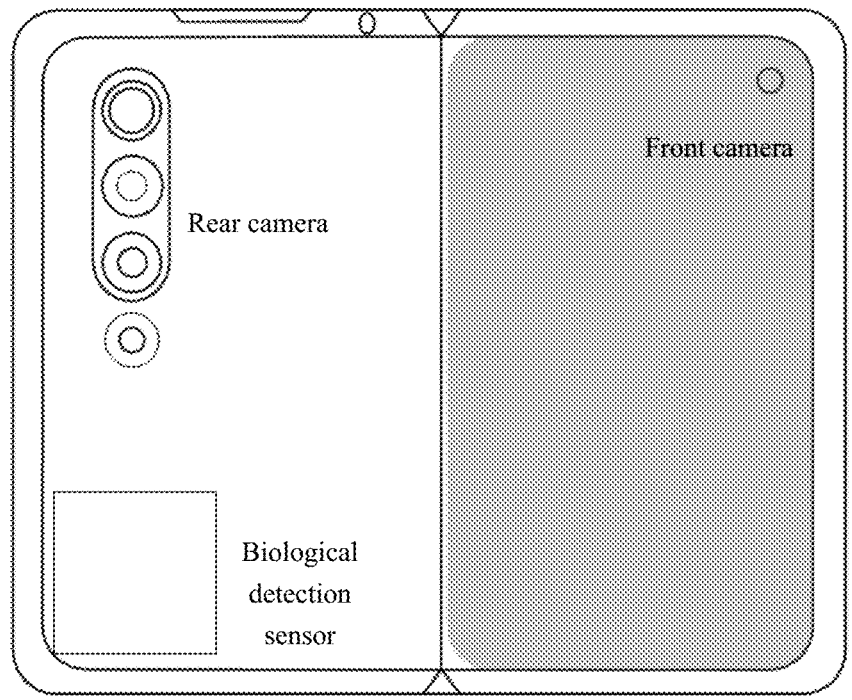

Fig. 2

DISPLAY CONTROL METHOD AND DEVICE, AND STORAGE MEDIUM

CROSS-REFERENCE TO RELATED APPLICATION

This application is based on and claims priority to Chinese Patent Application No. 202211130953.0 filed on Sep. 16, 2022, the entire disclosure of which is incorporated herein by reference for all purposes.

BACKGROUND

With the continuous progress of the technology, it's an important research of the display control of a terminal, e.g. applied in a terminal with a foldable screen.

The terminal with the foldable screen may bring great inconvenience to a user due to a large size of the screen when a message pop-up notification is displayed.

SUMMARY

The present disclosure relates to a field of terminals, and more particularly to a display control method, a display control device and a storage medium.

Embodiments of a first aspect of the present disclosure provide a display control method applied to a terminal. The method includes: in response to determining that a first screen represented by the terminal in an unfolded state is lit, detecting whether a function display interface to be displayed is triggered to be displayed in the first screen, in which a display area of the function display interface is smaller than a display area of the first screen; in response to detecting that the function display interface to be displayed is triggered, acquiring touch data detected on a second screen and sensor data detected by a biological detection sensor, in which the second screen is a screen represented by the terminal in a folded state, and the biological detection sensor is arranged on a side of the terminal in the folded state where no screen is arranged; determining a held position of the terminal according to the touch data and the sensor data, and controlling the function display interface to be displayed in a screen area of the first screen corresponding to the held position.

Embodiments of a second aspect of the present disclosure provide a display control device applied to a terminal. The device includes: a detecting unit configured to detect whether a function display interface to be displayed is triggered to be displayed in a first screen, in response to that the first screen represented by the terminal in an unfolded state is lit, in which a display area of the function display interface is smaller than a display area of the first screen; an acquiring unit configured to acquire touch data detected on a second screen and sensor data detected by a biological detection sensor in response to detecting that the function display interface to be displayed is triggered, in which the second screen is a screen represented by the terminal in a folded state, and the biological detection sensor is arranged on a side of the terminal in the folded state where no screen is arranged; and a display unit configured to determine a held position of the terminal according to the touch data and the sensor data, and control the function display interface to be displayed in a screen area of the first screen corresponding to the held position.

Embodiments of a third aspect of the present disclosure provide a display control device. The device includes: a processor and a memory configured to store an instruction executable by the processor. The processor is configured to perform a display control method. The display control method includes: in response to determining that a first screen represented by the terminal in an unfolded state is lit, detecting whether a function display interface to be displayed is triggered to be displayed in the first screen, in which a display area of the function display interface is smaller than a display area of the first screen; in response to detecting that the function display interface to be displayed is triggered, acquiring touch data detected on a second screen and sensor data detected by a biological detection sensor, in which the second screen is a screen represented by the terminal in a folded state, and the biological detection sensor is arranged on a side of the terminal in the folded state where no screen is arranged; determining a held position of the terminal according to the touch data and the sensor data, and controlling the function display interface to be displayed in a screen area of the first screen corresponding to the held position.

It should be understood that the above general description and the following detailed description are illustrative and explanatory only, and do not limit the present disclosure.

BRIEF DESCRIPTION OF DRAWINGS

The drawings herein are incorporated into and constitute a part of the specification, show the embodiments consistent with the present disclosure and illustrate the principles of the present disclosure together with the specification.

FIG. 1 is a flow chart of a display control method according to an example.

FIG. 2 is a schematic view of a terminal according to an example.

DETAILED DESCRIPTION

Figure 3:
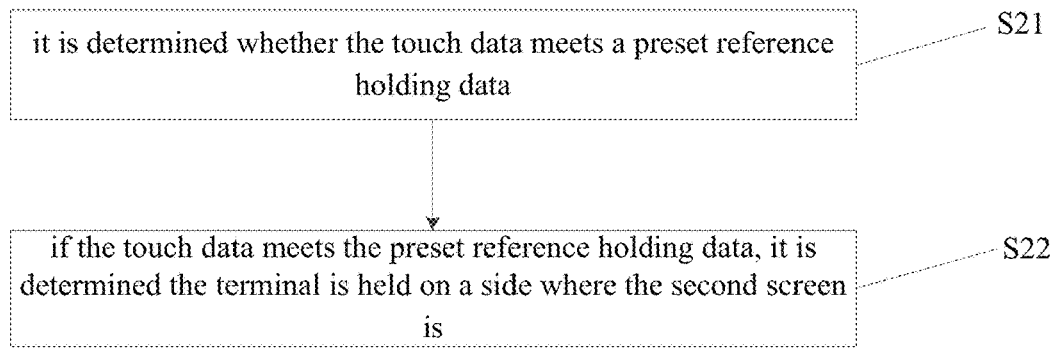
FIG. 3 is a flow chart of a method of determining a held position of a terminal according to touch data and sensor data according to an example.

Here, embodiments will be described in detail, examples of which are shown in the accompanying drawings. When the following description refers to the drawings, unless otherwise indicated, the same numbers in different drawings indicate the same or similar elements. The implementations described in the following examples do not represent all the embodiments consistent with the present disclosure.

In the related art, in a terminal having a foldable screen, since the foldable screen has a large size in an unfolded state, a user may have an inconvenient operation in a using process. For example, when the terminal having the foldable screen detects a pop-up window or a notification, the pop-up window or the notification usually is displayed in the middle of the screen in the unfolded state, which has a great influence on the user's timely handling of the pop-up window or the notification.

In the related art, a touch sensor is used to detect whether the terminal is held, the touch sensor is arranged to the screen, and the detected touch data is the data received from a front surface of the terminal, which cannot accurately detect a held position of the terminal. The display of a function display interface is fixed, so the user experience is poor.

Based on this, the present disclosure provides a display control method, which acquires touch data and sensor data through first and second screens arranged on a terminal and a biological detection sensor arranged on a side of the terminal where the second screen is not arranged in a folded state, the current held position of the terminal is determined through the detection of the touch data and the sensor data, and the display of the terminal is controlled according to the held position.

FIG. 1 is a flow chart of a display control method according to an embodiment of the present disclosure. As shown in FIG. 1, the display control method is applied to the terminal, and includes the following steps.

At step S11, in response to that a first screen represented by the terminal in an unfolded state is lit, it is detected whether a function display interface to be displayed is triggered to be displayed in the first screen, in which a display area of the function display interface is smaller than a display area of the first screen.

In the embodiment of the present disclosure, the terminal includes the first screen and a second screen. The first screen may be a screen represented by the terminal in the unfolded state, e.g. a foldable screen of a foldable terminal.

In the present disclosure, the terminal may be a terminal having the foldable screen, in response to that the first screen, i.e., an expandable large screen is in a lit or used state, it is detected whether the function display interface to be displayed is triggered to be displayed in the first screen. The size of the display area of the function display interface is smaller than the size of the display area of the first screen. For example, the function display interface may be a pop-up window, a notification, a small window video, or the like to be displayed.

At step S12, in response to detecting that the function display interface to be displayed is triggered, touch data detected on a second screen and sensor data detected by a biological detection sensor are acquired.

In the embodiment of the present disclosure, the second screen is a screen represented by the terminal in a folded state, and the biological detection sensor is arranged on a side of the terminal in the folded state where no screen is arranged. For example, the second screen may be an outside screen of the foldable terminal in the folded state.

In the embodiment of the present disclosure, the biological detection sensor may be used for detecting whether the terminal is held and the held position, so a position of the biological detection sensor is arranged in the terminal and away from an antenna. FIG. 2 is a schematic view of a terminal according to an example. As shown in FIG. 2, the biological detection sensor may detect the proximity and departure of a charged object, and may be used for detecting whether being held by a user in the embodiment of the present disclosure, so it may be arranged at a position where the user can touch it when holding the terminal. For example, the biological detection sensor may be arranged at a lower quarter of the side of the terminal in the folded state where the second screen is not arranged.

In the embodiment of the present disclosure, the terminal further includes the biological detection sensor. The biological detection sensor may include a SAR sensor (an electromagnetic wave absorption proximity sensor), an infrared sensor, a tactile sensor, etc. The biological detection sensor is located on the side of the terminal in the folded state where the second screen is not arranged.

In the embodiment of the present disclosure, when it is detected that the function display interface to be displayed is triggered to be displayed, the data collected by the sensor on the second screen and by the sensor on the side of the terminal in the folded state where the second screen is not arranged is acquired.

At step S13, a held position of the terminal is determined according to the touch data and the sensor data, and the function display interface is controlled to be displayed in a screen area of the first screen corresponding to the held position.

In the embodiment of the present disclosure, according to the data collected by the two sensors, i.e. the touch data and the sensor data, it is determined that the terminal is held, the held position of the terminal is determined, and the function display interface is controlled to be displayed in a portion on the first screen corresponding to the held position.

The display control method according to the embodiment of the present disclosure detects the current held position of the terminal by acquiring the data collected by the sensor in the terminal, and the function display interface is controlled to be displayed in the first screen according to the determined held position. It is convenient for the user to handle the function display interface when the function display interface pops up while the user is using the foldable screen terminal or the large screen terminal.

The following embodiments of the present disclosure will further explain and illustrate a method of determining the held position of the terminal according to the touch data and the sensor data in the above embodiments of the present disclosure.

FIG. 3 is a flow chart of the method of determining the held position of the terminal according to the touch data and the sensor data according to an example. As shown in FIG. 3, the method of determining the held position of the terminal according to the touch data and the sensor data includes the following steps.

At step S21, it is determined whether the touch data meets a preset reference holding data.

At step S22, if the touch data meets the preset reference holding data, it is determined the terminal is held on a side where the second screen is.

In the embodiment of the present disclosure, it is determined whether the touch data collected by the touch sensor at the second screen meets the preset reference holding data. The preset reference holding data comes from the burying data collected by the terminal in the daily use of the user. The source of the dotting may be the touch data collected by the touch sensor of the second screen when the user daily uses the terminal. At the same time, the touch data is calibrated by the burying data at preset time intervals, and the reference holding data is finely adjusted according to the latest touch data of the user.

In the embodiment of the present disclosure, for the terminal newly output from the factory, the reference holding data is preset, the reference holding data may come from a plurality of experiments in advance, and an average held position is obtained through the experiments in advance and serves as the reference holding data. With the user's use, the touch data is calibrated at preset time intervals. For example, the reference holding data may be finely adjusted every two days to fit more with the user's holding habits.

In the embodiment of the present disclosure, if it is determined that the touch data meets the preset reference holding data, it can be judged that the terminal has detected the user's holding on the second screen, and it is determined that the terminal is held on the side where the second screen is.

In the embodiment of the present disclosure, the method of determining that the terminal is held according to the touch data and the sensor data, judges whether the second screen of the current terminal is held according to the relationship between the touch data collected by the second screen and the reference holding data.

The following embodiments of the present disclosure further explain the method of determining the held position of the terminal according to the touch data and sensor data in the above embodiments of the present disclosure.

Figure 4:
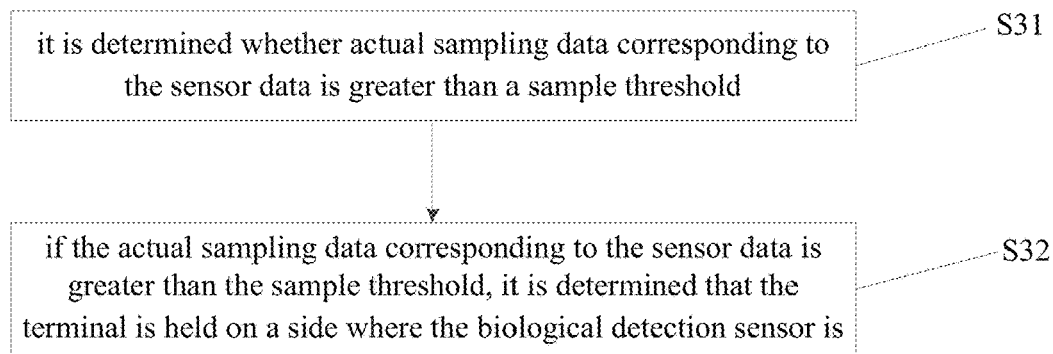
FIG. 4 is a flow chart of a method of determining a held position of a terminal according to touch data and sensor data according to an example.

FIG. 4 is a flow chart of the method of determining the held position of the terminal according to the touch data and the sensor data according to an example. As shown in FIG. 4, the method of determining the held position of the terminal according to the touch data and the sensor data includes the following steps.

At step S31, it is determined whether actual sampling data corresponding to the sensor data is greater than a sample threshold.

At step S32, if the actual sampling data corresponding to the sensor data is greater than the sample threshold, it is determined that the terminal is held on a side where the biological detection sensor is.

In the embodiment of the present disclosure, the sample threshold is preset, and may be used to detect whether the charged object is in proximity to the biological detection sensor. For example, when the charged object or a creature is in proximity to the biological detection sensor, a capacitance will change.

In the embodiment of the present disclosure, when a hand of the user is proximate to the terminal until being completely fitted with the terminal, the capacitance of the biological detection sensor changes within a range. The sample threshold may be set as a capacitance value of the biological detection sensor when the use's hand is proximate to the terminal. When the actual sampling data corresponding to the sensor data is greater than the sample threshold, it can be judged that the terminal is held on the side where the biological detection sensor is.

The method of determining the held position of the terminal according to the touch data and the sensor data according to the embodiment of the present disclosure judges whether the current terminal is held at the biological detection sensor according to a relationship between the sensor data and the sample threshold.

The following embodiments of the present disclosure further explain and illustrate the method of controlling the function display interface to be displayed in the screen area of the first screen corresponding to the held position in the above embodiments of the present disclosure.

Figure 5:
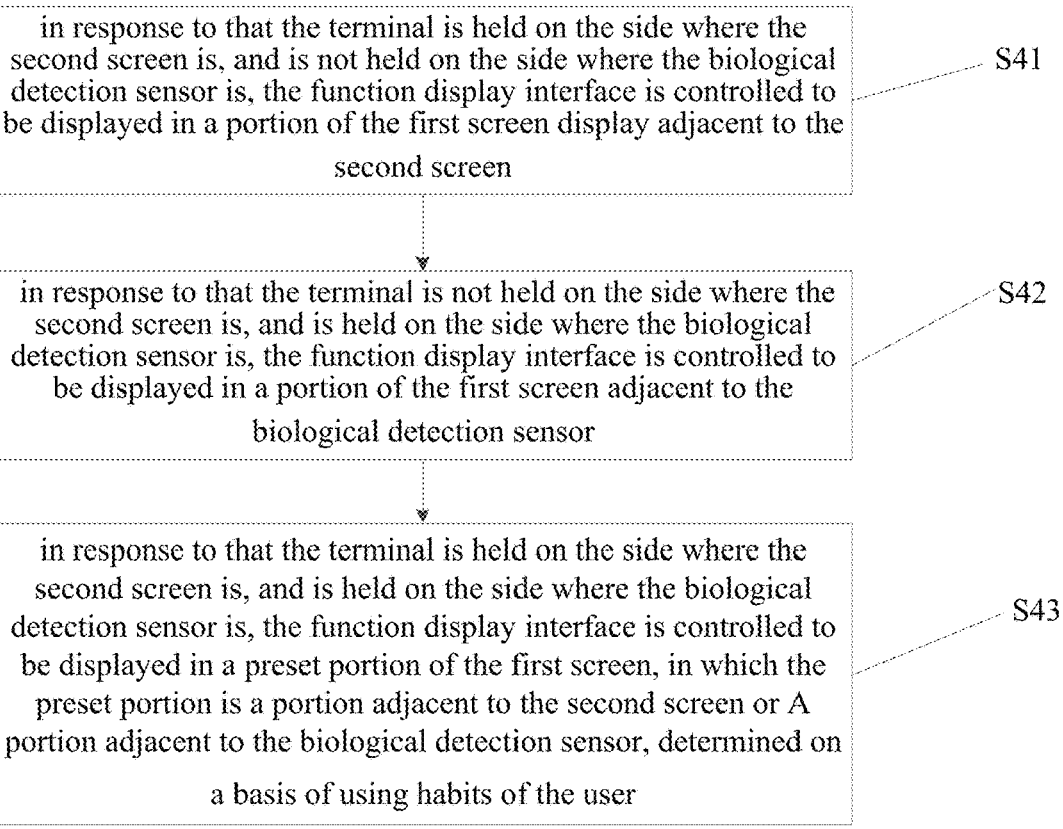
FIG. 5 is a flow chart of a method of controlling a function display interface to be displayed in a screen area of a first screen corresponding to a held position according to an example.

FIG. 5 is a flow chart of the method of controlling the function display interface to be displayed in the screen area of the first screen corresponding to the held position according to an example. As shown in FIG. 5, the method of controlling the function display interface to be displayed in the screen area of the first screen corresponding to the held position includes the following steps.

At step S41, in response to that the terminal is held on the side where the second screen is, and is not held on the side where the biological detection sensor is, the function display interface is controlled to be displayed in a portion of the first screen display adjacent to the second screen.

In the embodiment of the present disclosure, it is determined that the terminal is held on the side where the second screen is, e.g. being held by a left hand of the user, and is not be held on the side where the biological detection sensor is, e.g. being not held by a right hand of the user. That is, when the terminal is held by the left hand, the function display interface is controlled to be displayed in a left portion of the first screen, i.e., in the portion of the first screen adjacent to the second screen.

At step S42, in response to that the terminal is not held on the side where the second screen is, and is held on the side where the biological detection sensor is, the function display interface is controlled to be displayed in a portion of the first screen adjacent to the biological detection sensor.

In the embodiment of the present disclosure, when it is determined that the terminal is not held on the side where the second screen is and is held on the side where the biological detection sensor is, that is, the terminal is held by the right hand of the user and not held by the left hand of the user, the function display interface is controlled to be displayed in a right portion of the first screen, i.e., in the portion of the first screen adjacent to the biological detection sensor.

At step S43, in response to that the terminal is held on the side where the second screen is, and is held on the side where the biological detection sensor is, the function display interface is controlled to be displayed in a preset portion of the first screen. The preset portion is a portion adjacent to the second screen or a portion adjacent to the biological detection sensor, determined on a basis of using habits of the user.

In the embodiment of the present disclosure, when it is determined that the terminal is held on the side where the second screen is and also held on the side where the biological detection sensor is, that is, the terminal is held by the user with both hands, the function display interface is displayed in the portion based on the using habits of the user. For example, the function display interface may be displayed in the portion on a left hand side adjacent to the second screen, and also may be displayed in the portion on a right hand side adjacent to the biological detection sensor, which is determined on a basis of the daily collected using habits of the user.

The method of controlling the function display interface to be displayed in the screen area of the first screen corresponding to the held position according to the embodiment of the present disclosure controls the function display interface to be displayed in the corresponding portion according to the fact that the terminal is held at different portions.

The following embodiments of the present disclosure further explain and illustrate the method of controlling the function display interface to be displayed in the screen area of the first screen corresponding to the held position in the above embodiments of the present disclosure.

Figure 6:
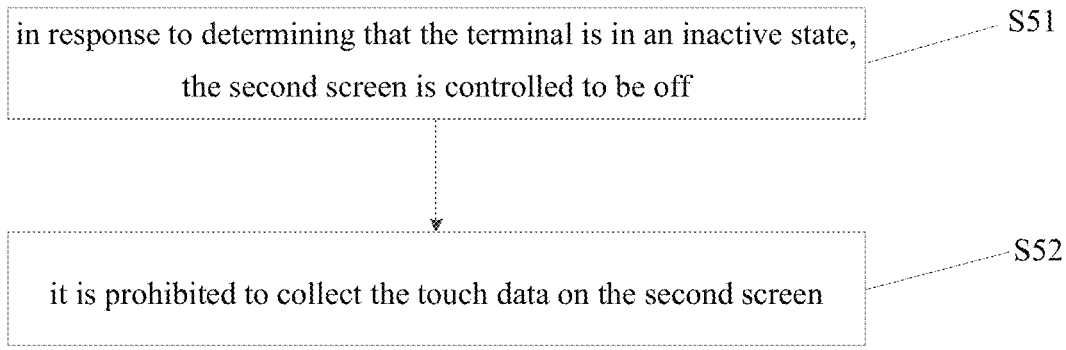
FIG. 6 is a flow chart of a method of controlling a function display interface to be displayed in a screen area of a first screen corresponding to a held position according to an example.

FIG. 6 is a flow chart of the method of controlling the function display interface to be displayed in the screen area of the first screen corresponding to the held position according to an example. As shown in FIG. 6, the method of controlling the function display interface to be displayed in the screen area of the first screen corresponding to the held position includes the following steps.

At step S51, in response to determining that the terminal is in an inactive state, the second screen is controlled to be off.

At step S52, it is prohibited to collect the touch data on the second screen.

In the embodiment of the present disclosure, when the terminal is not started, the second screen is controlled to be off. When it is detected that the touch data conforms to the preset reference holding data, it is judged that the terminal is currently in a held state but is not in use, and it is forbidden to collect touch operations correspondingly generating the touch data on the second screen.

The method of controlling the function display interface to be displayed in the screen area of the first screen corresponding to the held position suppresses the touch operations correspondingly generating the touch data on the second screen when the terminal is not in use, thus reducing the touch by mistake.

The following embodiments of the present disclosure further explain and illustrate of controlling the function display interface to be displayed in the screen area of the first screen corresponding to the held position in the above embodiments of the present disclosure.

Figure 7:
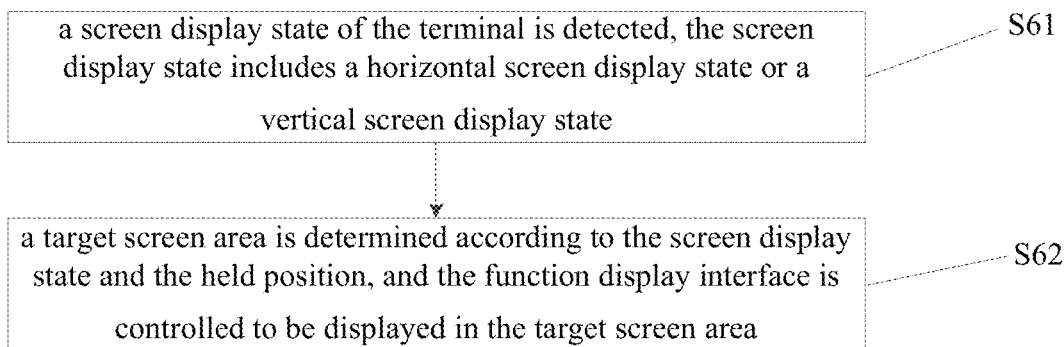
FIG. 7 is a flow chart of a method of controlling a function display interface to be displayed in a screen area of a first screen corresponding to a held position according to an example.

FIG. 7 is a flow chart of the method of controlling the function display interface to be displayed in the screen area of the first screen corresponding to the held position according to an example. As shown in FIG. 7, the method of controlling the function display interface to be displayed in the screen area of the first screen corresponding to the held position includes the following steps.

At step S61, a screen display state of the terminal is detected, the screen display state includes a horizontal screen display state or a vertical screen display state.

In the embodiment of the present disclosure, the screen display state of the terminal is detected, the screen display state includes the horizontal screen display state or the vertical screen display state, and a detection method includes but is not limited to a gravity acceleration induction, etc.

At step S62, a target screen area is determined according to the screen display state and the held position, and the function display interface is controlled to be displayed in the target screen area.

In the embodiment of the present disclosure, if the screen display state is the horizontal screen display state, and it is detected that a left portion of the screen is held, the function display interface is controlled to be displayed in the left portion of the screen; if the screen display state is the horizontal screen display state, and it is detected that a right portion of the screen is held, the function display interface is controlled to be displayed in the right portion of the screen.

In the embodiment of the present disclosure, if the screen display state is the vertical screen display state, and it is detected that an upper portion of the screen is held, the function display interface is controlled to be displayed in the upper portion of the screen; if the screen display state is the vertical screen display state, and it is detected that a lower portion of the screen is held, and the function display interface is controlled to be displayed in the lower portion of the screen.

In the embodiment of the present disclosure, the target screen area may be preset by the user, or may be set according to the using habits of the user, i.e., according to habitual clicking positions of the user, which is not limited.

The method of controlling the function display interface to be displayed in the screen area of the first screen corresponding to the held position according to the embodiment of the present disclosure combines the screen display state with the held position, and can determine the display position according to the horizontal screen display state or the vertical screen display state in which the terminal is and the position where the user holds the terminal, which is convenient for the user to use the terminal and handle the pop-up function display interface in time.

The following embodiments of the present disclosure further explain and illustrate the method of controlling the function display interface to be displayed in the screen area of the first screen corresponding to the held position in the above embodiments of the present disclosure.

Figure 8:
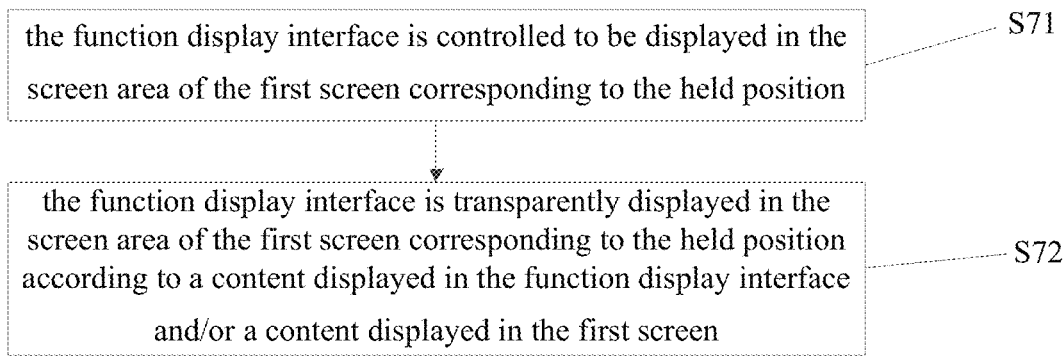
FIG. 8 is a flow chart of a method of controlling a function display interface to be displayed in a screen area of a first screen corresponding to a held position according to an example.

FIG. 8 is a flow chart of the method of controlling the function display interface to be displayed in the screen area of the first screen corresponding to the held position according to an example. As shown in FIG. 8, the method of controlling the function display interface to be displayed in the screen area of the first screen corresponding to the held position includes the following steps.

At step S71, the function display interface is controlled to be displayed in the screen area of the first screen corresponding to the held position.

At step S72, the function display interface is transparently displayed in the screen area of the first screen corresponding to the held position according to a content displayed in the function display interface and/or a content displayed in the first screen.

In the embodiment of the present disclosure, according to the content displayed in the pop-up function display interface and/or the first screen, the function display interface is controlled to be transparently displayed. For example, when the function display interface is a low priority interface and the content displayed in the first screen has a high priority, the function display interface is transparently displayed. When the function display interface is a high priority interface and the content displayed in the first screen has a low priority, the content displayed in the first screen is transparently displayed. The setting of the priorities of the content displayed in the function display interface and the first screen may be determined according to the user's presetting or may be preset by the terminal.

It may be understood that being transparently displayed means that the displayed content is at least partially transparent. For example, a transparency of the displayed content is less than or equal to 30%.

The display method of controlling the function display interface to be displayed in the screen area of the first screen corresponding to the held position according to the embodiment of the present disclosure can more prominently remind the user of the content to be handled in priority.

The following embodiments of the present disclosure further explain and illustrate the method of transparently displaying the function display interface in the screen area of the first screen corresponding to the held position according to the content displayed in the function display interface and/or the content displayed in the first screen in the above embodiments of the present disclosure.

Figure 9:
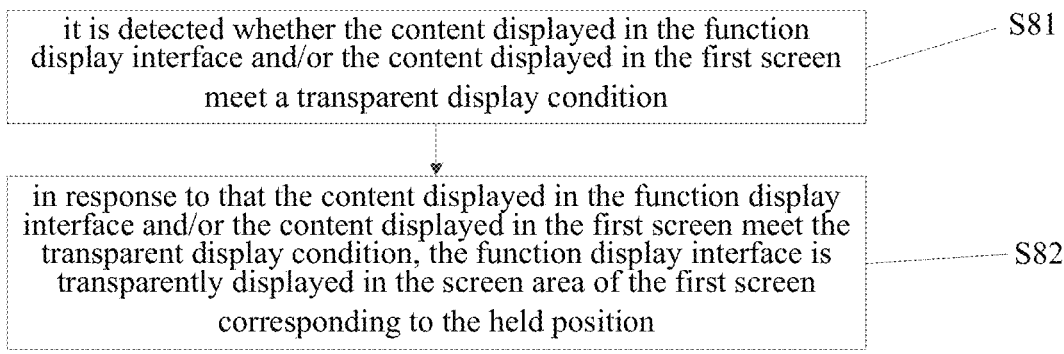
FIG. 9 is a flow chart of a method of transparently displaying a function display interface in a screen area of a first screen corresponding to a held position according to a content displayed in the function display interface and/or a content displayed in the first screen according to an example.

FIG. 9 is a flow chart of the method of transparently displaying the function display interface in the screen area of the first screen corresponding to the held position according to the content displayed in the function display interface and/or the content displayed in the first screen according to an example. As shown in FIG. 9, the method of transparently displaying the function display interface in the screen area of the first screen corresponding to the held position according to the content displayed in the function display interface and/or the content displayed in the first screen includes the following steps.

At step S81, it is detected whether the content displayed in the function display interface and/or the content displayed in the first screen meet a transparent display condition.

In the embodiment of the present disclosure, meeting the transparent display condition includes one or more of the followings: the priority of the content displayed in the function display interface is lower than the priority of the content displayed in the first screen; the content displayed in the function display interface conforms to a preset content type.

In the embodiment of the present disclosure, the priority of the content may be preset by the user, or may be set according to the using habits of the user, or may be preset by the terminal, which is not limited.

In the embodiment of the present disclosure, the content displayed in the function display interface conforms to the preset content type, and the preset content type may be news, system notification, etc.

At step S82, in response to that the content displayed in the function display interface and/or the content displayed in the first screen meet the transparent display condition, the function display interface is transparently displayed in the screen area of the first screen corresponding to the held position.

In the embodiment of the present disclosure, in response to that the priority of the content displayed in the function display interface is lower than the priority of the content displayed in the first screen, the function display interface is transparently displayed; and/or, in response to the content displayed in the function display interface conforms to the preset content type, the function display interface is transparently displayed.

The method of transparently displaying the function display interface according to the embodiment of the present disclosure is convenient for the user to handle the content displayed in the terminal.

The following embodiments of the present disclosure further explain and illustrate the function display interface in the above embodiments of the present disclosure.

In the embodiment of the present disclosure, the function display interface includes at least one of the followings: a pop-up interface, a sidebar interface, a small window interface, and a password/verification code input interface.

In the embodiment of the present disclosure, there are different use scenarios in the user's use process, and also, a one-hand holding two-hand operation and a one-hand holding one-hand operation need to be distinguished, which include automatic switching of the following functions. For example, the function display interface is the pop-up interface, and during the running of the program, there are various system permissions. When this pop-up interface appears, the display position of the pop-up interface is judged according to the position of the user's hand.

In the embodiment of the present disclosure, for example, the function display interface includes the sidebar interface and the small window interface, and a position where the sidebar interface appears and a position where the small window interface appears are determined according to the position of the user's hand, and will change along with a change of the position of the user's hand.

In the embodiment of the present disclosure, for example, the function display interface is the password/verification code input interface, and the display position of the password input interface for unlocking the screen will be judged according to the holding of the user's hand at the beginning. If the left hand holds the terminal, the password input interface appears on the left side. If the right hand holds the terminal, the password input interface appears on the right side. With one hand holding the terminal, a simple input can be completed in a half of the screen.

In the embodiment of the present disclosure, the method of controlling the function display interface to be displayed on a basis of the held position of the terminal according to the above embodiments of the present disclosure is illustrated by taking a mobile terminal with a foldable screen, a TOUCH sensor (a touch sensor) and a SAR sensor (an electromagnetic wave absorption proximity sensor) as examples.

Figure 10:
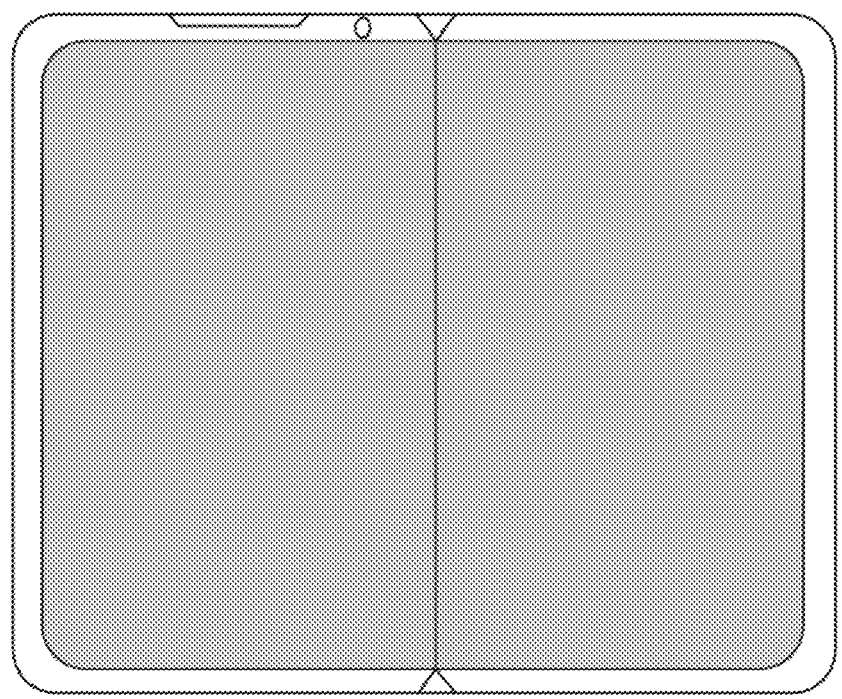
FIG. 10 is a schematic view of a first screen of a mobile terminal with a foldable screen according to an example.
Figure 11:
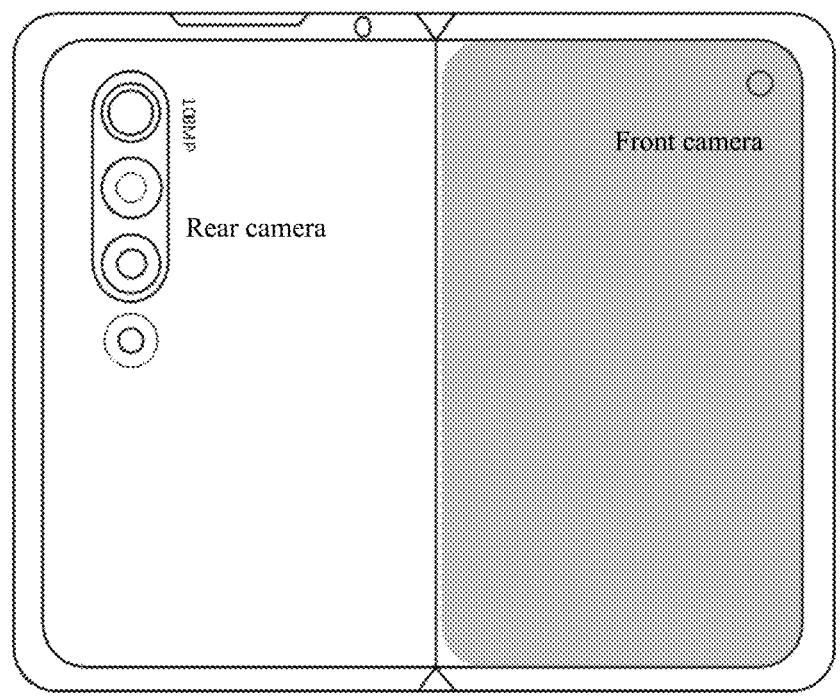
FIG. 11 is a schematic view of a second screen of a mobile terminal with a foldable screen according to an example.

In the embodiment of the present disclosure, the mobile terminal with the foldable screen has a large internal screen in an unfolded state, which is called the first screen, and also a small external screen in the folded state, which is called the second screen. FIG. 10 is a schematic view of the first screen of the mobile terminal with the foldable screen according to an example. FIG. 11 is a schematic view of the second screen of the mobile terminal with the foldable screen according to an example. As shown in FIG. 10 and FIG. 11, a shaded part in FIG. 10 is the first screen, and a shaded part in FIG. 11 is the second screen.

In the embodiment of the present disclosure, in response to that the mobile terminal with the foldable screen is in the unfolded state and the screen is lit for use, a function display interface detection mechanism is started, that is, it is detected whether the function display interface is triggered at present. When it is detected that the function display interface is triggered, a detection for the held position of the mobile terminal is started.

In the embodiment of the present disclosure, in response to starting the detection for the held position of the mobile terminal, the TOUCH sensor located on the second screen is turned on. It is detected whether the touch data collected on the current terminal meets standard holding data. If the standard holding data is met, it is judged that the current user holds the terminal with the left hand. The standard holding data is obtained by a plurality of trainings, and also is finely adjusted according to the using habits of each user in the user's daily use.

In the embodiment of the present disclosure, in response to starting the detection for the held position of the mobile terminal, and in response to that the terminal does not light the screen or that the terminal is controlled through the second screen, the touch data is detected, and the touch operation correspondingly generating the touch data on the second screen is suppressed.

In the embodiment of the present disclosure, in response to starting the detection for the held position of the mobile terminal, the SAR sensor located on the side of the mobile terminal in the folded state where the second screen is not arranged is turned on. The capacitance value of the SAR sensor when a charged object is in proximity to the SAR sensor is preset as the sample threshold. When it is detected that the sample data collected by the current SAR sensor reaches above the preset sample threshold, it is judged that the current user holds the terminal with the right hand.

In the embodiment of the present disclosure, when it is detected that the user holds the terminal with the left hand and the terminal is used in the unfolded state, the function display interface is displayed in the left portion of the first screen. When it is detected that the user holds the terminal with the right hand and the terminal is used in the unfolded state, the function display interface is displayed in the right portion of the first screen.

In the embodiment of the present disclosure, when it is detected the user holds the terminal with two hands and the terminal is used in the unfolded state, the function display interface is displayed on a side of the user's dominant hand. The dominant hand is obtained by a TOUCH track detection. For example, it is detected that the last operation of the user before the function display interface is popped up is on the left portion or the right portion of the first screen, and the current function display interface is displayed according to this. If the last operation is on the left portion, the function display interface is displayed in the left portion of the first screen. If the last operation is on the right portion, the function display interface is displayed in the right portion of the first screen.

In the embodiment of the present disclosure, when it is detected that the user does not hold the terminal and the terminal is used in the unfolded state, the function display interface is displayed in the middle of the first screen.

In the embodiment of the present disclosure, the function display interface is not limited to the pop-up interface, and also may include a sidebar interface, a small window video interface, and a password input interface, etc.

In the embodiment of the present disclosure, the mobile terminal can also detect a holding position of the user's hand according to the touch data and the sensor data, and display the function display interface. Moreover, the touch data can not only detect the holding position of the user's hand at a lower part of the mobile terminal, but also detect the holding position of the user at an upper part of the mobile terminal. For example, when a child holds the mobile terminal, the holding position of the child may be relatively high due to the small hands of the child, and the mobile terminal may display the function display interface at the holding position of the child, that is, the upper part of the mobile terminal.

Based on the same concept, the embodiment of the present disclosure also provides a display control device.

It should be understood that the display control device according to the embodiment of the present disclosure is aimed to fulfill the above functions, and includes corresponding hardware structures and/or software modules for executing various functions. In combination with the units and algorithm steps of the examples disclosed in the embodiments of the present disclosure, the embodiments of the present disclosure can be implemented in the form of hardware or a combination of hardware and computer software. Whether a function is executed by hardware or in the form of computer software driving hardware depends on the specific application and design constraints of the technical solution. Those skilled in the art may use different methods to realize the described functions for each specific application, but this realization should not be considered beyond the scope of the technical solutions of the embodiments of the present disclosure.

Figure 12:
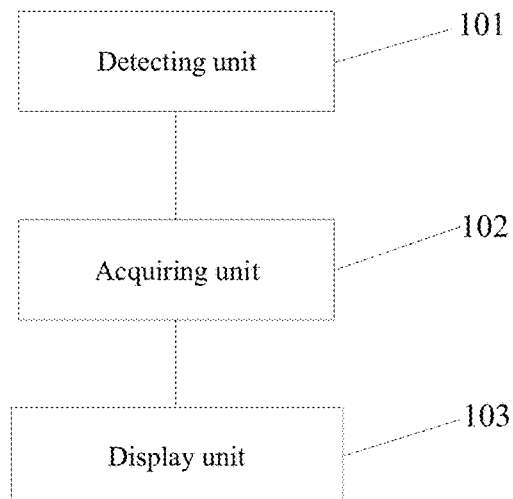
FIG. 12 is a block diagram of a display control device according to an example.

FIG. 12 is a block diagram of a display control device according to an example. As shown in FIG. 12, the device 100 includes a detecting unit 101, an acquiring unit 102 and a display unit 102.

The detecting unit 101 is configured to detect whether a function display interface to be displayed is triggered to be displayed in the first screen, in response to that a first screen represented by the terminal in an unfolded state is lit, and a display area of the function display interface is smaller than a display area of the first screen.

The acquiring display unit 102 is configured to acquire touch data detected on the second screen and sensor data detected by a biological detection sensor, in response to that it is detected that the function display interface to be displayed is triggered. The second screen is a screen represented by the terminal in a folded state, and the biological detection sensor is arranged on a side of the terminal in the folded state where no screen is arranged.

The display unit 103 is configured to determine a held position of the terminal according to the touch data and the sensor data, and control the function display interface to be displayed in a screen area of the first screen corresponding to the held position.

In an embodiment, the display unit 103 determines the held position of the terminal according to the touch data and the sensor data in the following manner: if the touch data meets a preset reference holding data, it is determined that the terminal is held on a side where the second screen is; and/or, if an actual sampling value corresponding to the sensor data is greater than a sample threshold, it is determined that the terminal is held on a side where the biological detection sensor is.

In an embodiment, the display unit 103 controls the function display interface to be displayed in the screen area of the first screen corresponding to the held position in the following manner: controlling the function display interface to be displayed in a portion of the first screen adjacent to the second screen in response to that the terminal is held on the side where the second screen is and is not held on the side where the biological detection sensor is; controlling the function display interface to be displayed in a portion of the first screen adjacent to the biological detection sensor in response to that the terminal is not held on the side where the second screen is and is held on the side where the biological detection sensor is; controlling the function display interface to be displayed in a preset portion of the first screen in response to that the terminal is held on the side where the second screen is and is held on the side where the biological detection sensor is, in which the preset portion is a portion adjacent to the second screen or a portion adjacent to the biological detection sensor, determined on a basis of using habits of a user.

In an embodiment, the device is further configured to control the second screen to be off, and prohibit collecting the touch data on the second screen, in response to determining that the terminal is in an inactive state.

In an embodiment, the display unit 103 controls the function display interface to be displayed in the screen area of the first screen corresponding to the held position in the following manner: detecting a screen display state of the terminal, in which the screen display state includes a horizontal screen display state or a vertical screen display state; determining a target screen area according to the screen display state and the held position, and controlling the function display interface to be displayed in the target screen area.

In an embodiment, the display unit 103 controls the function display interface to be displayed in the screen area of the first screen corresponding to the held position in the following manner: transparently displaying the function display interface in the screen area of the first screen corresponding to the held position according to a content displayed in the function display interface and/or a content displayed in the first screen.

In an embodiment, the display unit 103 transparently displays the function display interface in the screen area of the first screen corresponding to the held position according to the content displayed in the function display interface and/or the content displayed in the first screen in the following manner: in response to that the content displayed in the function display interface and/or the content displayed in the first screen meet a transparent display condition, the function display interface is transparently displayed in the screen area of the first screen corresponding to the held position. Satisfying the transparent display condition includes one or more of the following: a priority of the content displayed in the function display interface is lower than a priority of the content displayed in the first screen; the content displayed in the function display interface conforms to a preset content type.

In an embodiment, the function display interface includes at least one of the followings: a pop-up interface, a sidebar interface, a small window interface and a password/verification code input interface.

With regard to the device in the above embodiment, the specific manner in which each module performs the operation has been described in detail in the embodiment of the associated method, and will not be explained in detail here.

Figure 13:
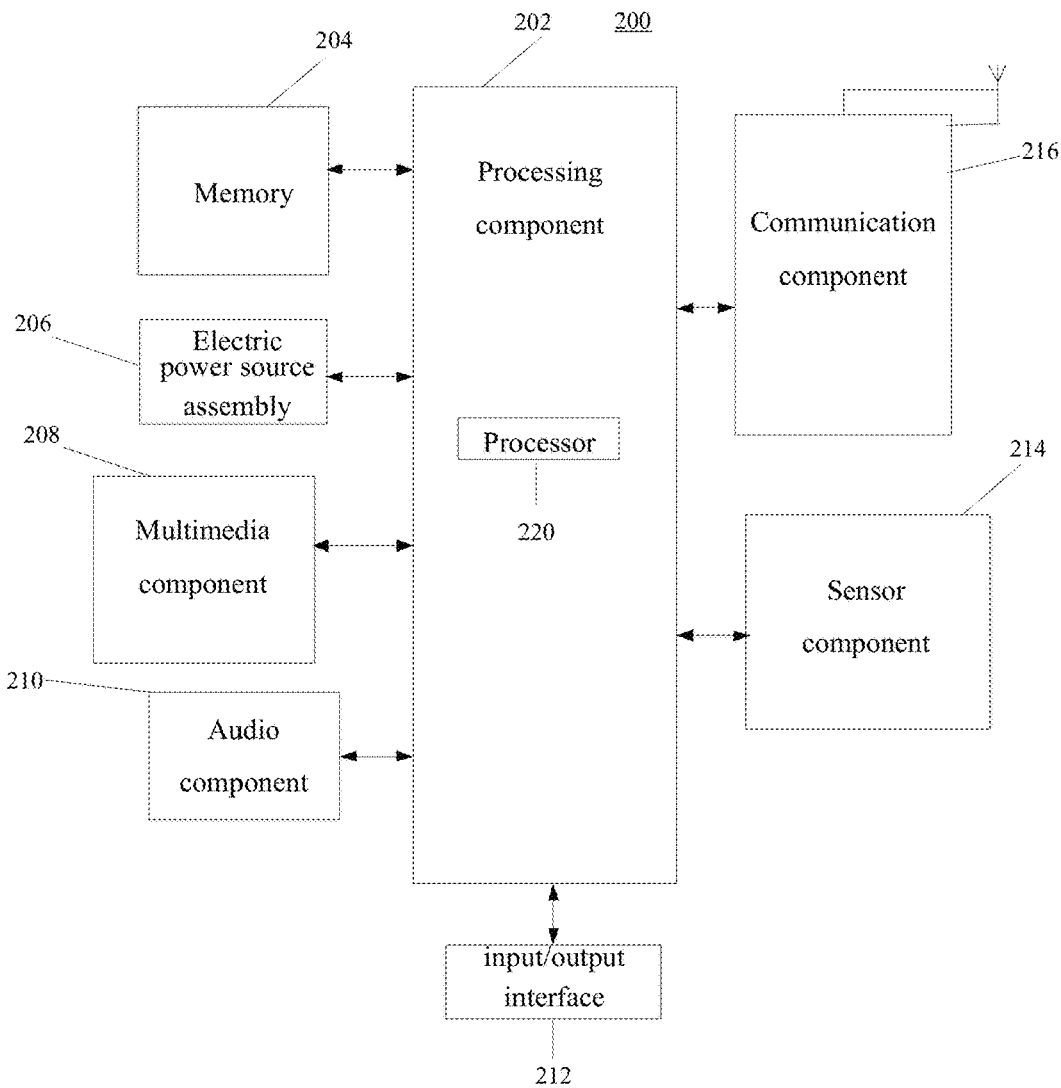
FIG. 13 is a block diagram of a device for display control according to an example.

FIG. 13 is a block diagram of a device for display control according to an example. For example, the device 200 may be a mobile phone, a computer, a digital broadcast device, a messaging device, a game console, a tablet device, a medical device, a fitness device, a personal digital assistant, and the like.

As illustrated in FIG. 13, the device 200 may include one or more components of the followings: a processor component 202, a memory 204, an electric power source assembly 206, a multimedia component 208, an audio component 210, an input/output (I/O) interface 212, a sensor assembly 214 and communication component 216.

The processing component 202 usually controls an overall operation of the device 200, such as operations associated with display, telephone calls, data communications, camera operations, and recording operations. The processing component 202 may include one or more processors 220 to execute instructions, to complete all or part of the steps in the above methods. In addition, the processing component 202 may include one or more modules which facilitate interaction between the processing component 202 and other components. For example, the processing component 202 may include a multimedia module to facilitate interaction between the multimedia component 208 and the processing component 202.

The memory 204 is configured to store various types of data to support operations at the device 200. Examples of such data include instructions for any application programs or methods operated on the device 200, contact data, phonebook data, messages, pictures, videos, etc. The memory 204 may be implemented using any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the device 200. The power component 206 may include a power management system, one or more power supplies, and other components related to generation, management, and distribution of power in the device 200.

The multimedia component 208 includes a screen that provides an output interface between the device 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 208 includes a front camera and/or a rear camera. When the device 200 is in an operation mode, such as a photographing mode or a video mode, the front camera and/or the rear camera may receive external multimedia data. Each of the front and rear cameras may be a fixed optical lens system or have a focus and optical zoom capability.

The audio component 210 is configured to output and/or input audio signals. For example, the audio component 210 includes a microphone (MIC) configured to receive an external audio signal when the device 200 is in an operating mode, such as a call mode, a recording mode, and a speech recognition mode. The received audio signal may be further stored in the memory 204 or transmitted via the communication component 216. In some embodiments, the audio component 210 further includes a loudspeaker, which is configured to output the audio signals.

The I/O interface 212 provides an interface between the processing component 202 and a peripheral interface module, such as a keyboard, a click wheel, a button and the like. The buttons may include, but are not limited to, a home button, a volume button, a starting button, and a locking button.

The sensor component 214 includes one or more sensors for providing status assessments of various aspects of the device 200. For example, the sensor component 214 may detect an on/off state of the device 200, a relative positioning of the components, such as the display and the keypad of the device 200, a change in position of the device 200 or of a component of the device 200, a presence or an absence of the user's contact with the device 200, an orientation or an acceleration/deceleration of the device 200, and a change in temperature of the device 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate wired or wireless communication between the device 200 and other devices. The device 200 can access a wireless network based on a communication standard, such as Wi-Fi, 2G, or 3G, or a combination of them. In an example, the communication component 216 receives a broadcast signal or broadcast related information from an external broadcast management system via a broadcast channel. In an example, the communication component 216 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the device 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

In an example, there is also provided a non-transitory computer readable storage medium including instructions, such as the memory 204 including instructions. The instructions can be executed by the processor 220 of the device 200 to perform the methods described above. For example, the non-transitory computer readable storage medium may be a ROM, a random access memory (RAM), a CD-ROM, a magnetic tape, a floppy disk, an optical data storage device, and the like.

It can be understood that "a plurality of" in the present disclosure means two or more than two, and other quantifiers are similar to this. The term "and/or" describes an association relationship of associated objects, and indicates that there may be three kinds relationships. For example, A and/or B may mean that A exists alone, A and B exist at the same time, and B exists alone. The character "/" generally indicates that the associated front and rear objects have an "or" relationship. The singular forms of "a", "said" and "the" are also intended to include plural forms, unless the context clearly indicates other meanings.

It can be further understood that the terms "first" and "second" are used to describe various kinds of information, but these information should not be limited to these terms. These terms are only used to distinguish the same type of information from each other, and do not indicate a specific order or importance. In fact, expressions such as "first" and "second" can be used interchangeably. For example, without departing from the scope of the present disclosure, the first information may also be called the second information, and similarly, the second information may also be called the first information.

It can be further understood that, unless otherwise specified, the term "connection" includes both a direct connection with no other components between two and an indirect connection with other elements between two.

It can be further understood that although the operations are described in a specific order in the drawings in the embodiments of the present disclosure, it should not be understood that these operations are required to be performed in the shown specific order or in a serial order, or that all the shown operations are required to be performed to obtain the desired results. In certain circumstances, multitasking and parallel processing may be advantageous.

Those skilled in the art will easily think of other embodiments of the present disclosure after considering the specification and practicing the invention disclosed herein. This application is intended to cover any variations, uses or adaptations of the present disclosure, which follow the general principles of the present disclosure and include the common knowledge or common technical means in the technical field not disclosed in the present disclosure.

It should be understood that the present disclosure is not limited to the precise structure described above and shown in the drawings, and various modifications and changes can be made without departing from its scope. The scope of the present disclosure is limited only by the appended claims.

What is claimed is:

1. A display control method, comprising:
   in response to determining that a first screen represented by the terminal in an unfolded state is lit, detecting, by a terminal, whether a function display interface to be displayed is triggered to be displayed in the first screen, wherein a display area of the function display interface is smaller than a display area of the first screen;
   in response to detecting that the function display interface to be displayed is triggered, acquiring, by the terminal, touch data detected on a second screen and sensor data detected by a biological detection sensor, wherein the second screen is a screen represented by the terminal in a folded state, and the biological detection sensor is arranged on a side of the terminal in the folded state where no screen is arranged; and
   determining, by the terminal, a held position of the terminal according to the touch data and the sensor data, and controlling the function display interface to be displayed in a screen area of the first screen corresponding to the held position;
   wherein determining the held position of the terminal according to the touch data and the sensor data, comprises at least one of: determining that the terminal is held on a side where the second screen is, in response to determining that the touch data meets preset reference holding data; or determining that the terminal is held on a side where the biological detection sensor is, in response to determining that an actual sampling value corresponding to the sensor data is greater than a sample threshold;
   wherein controlling the function display interface to be displayed in the screen area of the first screen corresponding to the held position, comprises:
   in response to that the terminal is held on the side where the second screen is and is not held on the side where the biological detection sensor is, controlling the function display interface to be displayed in a portion of the first screen adjacent to the second screen;
   in response to that the terminal is not held on the side where the second screen is and is held on the side where the biological detection sensor is, controlling the function display interface to be displayed in a portion of the first screen adjacent to the biological detection sensor;
   in response to that the terminal is held on the side where the second screen is and is held on the side where the biological detection sensor is, controlling the function display interface to be displayed in a preset portion of the first screen, wherein the preset portion is at least one of a portion adjacent to the second screen and a portion adjacent to the biological detection sensor, determined on a basis of using habits of a user.

2. The method according to claim 1, further comprising:
   in response to determining that the terminal is in an inactive state, controlling the second screen to be off, and prohibiting collecting the touch data on the second screen.

3. The method according to claim 1, further comprising:
in response to determining that the terminal is in an inactive state, controlling the second screen to be off, and prohibiting collecting the touch data on the second screen.

4. The method according to claim 1, wherein controlling the function display interface to be displayed in the screen area of the first screen corresponding to the held position, comprises:
detecting a screen display state of the terminal, wherein the screen display state comprises at least one of a horizontal screen display state and a vertical screen display state; and
determining a target screen area according to the screen display state and the held position, and controlling the function display interface to be displayed in the target screen area.

5. The method according to claim 4, wherein controlling the function display interface to be displayed in the screen area of the first screen corresponding to the held position, comprises:
transparently displaying the function display interface in the screen area of the first screen corresponding to the held position according to at least one of a content displayed in the function display interface and a content displayed in the first screen.

6. The method according to claim 5, wherein transparently displaying the function display interface in the screen area of the first screen corresponding to the held position according to the at least one of the content displayed in the function display interface and the content displayed in the first screen, comprises:
determining whether the at least one of the content displayed in the function display interface and the content displayed in the first screen meets a transparent display condition;
in response to that the at least one of the content displayed in the function display interface and the content displayed in the first screen meets the transparent display condition, transparently displaying the function display interface in the screen area of the first screen corresponding to the held position,
wherein the transparent display condition comprises at least one of:
a priority of the content displayed in the function display interface is lower than a priority of the content displayed in the first screen; or
the content displayed in the function display interface conforms to a preset content type.

7. The method according to claim 6, wherein the function display interface comprises at least one of a pop-up interface, a sidebar interface, a small window interface and a password/verification code input interface.

8. A display control device, applied to a terminal, and comprising:
a detecting unit configured to detect whether a function display interface to be displayed is triggered to be displayed in a first screen, in response to that the first screen represented by the terminal in an unfolded state is lit, wherein a display area of the function display interface is smaller than a display area of the first screen;
an acquiring unit configured to acquire touch data detected on a second screen and sensor data detected by a biological detection sensor in response to detecting that the function display interface to be displayed is triggered, wherein the second screen is a screen represented by the terminal in a folded state, and the biological detection sensor is arranged on a side of the terminal in the folded state where no screen is arranged; and
a display unit configured to determine a held position of the terminal according to the touch data and the sensor data, and control the function display interface to be displayed in a screen area of the first screen corresponding to the held position;
wherein the display unit determines the held position of the terminal according to the touch data and the sensor data in at least one of following manners: determining that the terminal is held on a side where the second screen is, in response to determining that the touch data meets a preset reference holding data; and determining that the terminal is held on a side where the biological detection sensor is, in response to determining that an actual sampling value corresponding to the sensor data is greater than a sample threshold;
wherein the display unit controls the function display interface to be displayed in the screen area of the first screen corresponding to the held position in a following manner;
in response to that the terminal is held on the side where the second screen is and is not held on the side where the biological detection sensor is, controlling the function display interface to be displayed in a portion of the first screen adjacent to the second screen;
in response to that the terminal is not held on the side where the second screen is and is held on the side where the biological detection sensor is, controlling the function display interface to be displayed in a portion of the first screen adjacent to the biological detection sensor;
in response to that the terminal is held on the side where the second screen is and is held on the side where the biological detection sensor is, controlling the function display interface to be displayed in a preset portion of the first screen, wherein the preset portion is at least one of a portion adjacent to the second screen and a portion adjacent to the biological detection sensor, determined on a basis of using habits of a user.

9. The device according to claim 8, wherein the device is further configured to control the second screen to be off and prohibit collecting the touch data on the second screen, in response to determining that the terminal is in an inactive state.

10. The device according to claim 8, wherein the device is further configured to control the second screen to be off and prohibit collecting the touch data on the second screen, in response to determining that the terminal is in an inactive state.

11. The device according to claim 8, wherein the display unit controls the function display interface to be displayed in the screen area of the first screen corresponding to the held position in a following manner:
detecting a screen display state of the terminal, wherein the screen display state comprises at least one of a horizontal screen display state and a vertical screen display state; and
determining a target screen area according to the screen display state and the held position, and controlling the function display interface to be displayed in the target screen area.

12. The device according to claim 11, wherein the display unit controls the function display interface to be displayed in the screen area of the first screen corresponding to the held position in a following manner:

transparently displaying the function display interface in the screen area of the first screen corresponding to the held position according to at least one of a content displayed in the function display interface and a content displayed in the first screen.

13. The device according to claim 12, wherein the display unit transparently displays the function display interface in the screen area of the first screen corresponding to the held position according to the at least one of the content displayed in the function display interface and the content displayed in the first screen in a following manner:
   in response to that the at least one of the content displayed in the function display interface and the content displayed in the first screen meets a transparent display condition, transparently displaying the function display interface in the screen area of the first screen corresponding to the held position,
   wherein the transparent display condition comprises at least one of:
   a priority of the content displayed in the function display interface is lower than a priority of the content displayed in the first screen; or
   the content displayed in the function display interface conforms to a preset content type.

14. The device according to claim 13, wherein the function display interface comprises at least one of a pop-up interface, a sidebar interface, a small window interface, a password/verification code input interface.

15. A display control device, comprising:
   a processor; and
   a memory configured to store an instruction executable by the processor,
   wherein the processor is configured to perform a display control method, and the display control method comprises:
      in response to determining that a first screen represented by a terminal in an unfolded state is lit, detecting whether a function display interface to be displayed is triggered to be displayed in the first screen, wherein a display area of the function display interface is smaller than a display area of the first screen;
      in response to detecting that the function display interface to be displayed is triggered, acquiring touch data detected on a second screen and sensor data detected by a biological detection sensor, wherein the second screen is a screen represented by the terminal in a folded state, and the biological detection sensor is arranged on a side of the terminal in the folded state where no screen is arranged; and
      determining a held position of the terminal according to the touch data and the sensor data, and controlling the function display interface to be displayed in a screen area of the first screen corresponding to the held position;
   wherein determining the held position of the terminal according to the touch data and the sensor data, comprises at least one of: determining that the terminal is held on a side where the second screen is, in response to determining that the touch data meets preset reference holding data; or determining that the terminal is held on a side where the biological detection sensor is, in response to determining that an actual sampling value corresponding to the sensor data is greater than a sample threshold;
   wherein controlling the function display interface to be displayed in the screen area of the first screen corresponding to the held position, comprises:
   in response to that the terminal is held on the side where the second screen is and is not held on the side where the biological detection sensor is, controlling the function display interface to be displayed in a portion of the first screen adjacent to the second screen;
   in response to that the terminal is not held on the side where the second screen is and is held on the side where the biological detection sensor is, controlling the function display interface to be displayed in a portion of the first screen adjacent to the biological detection sensor;
   in response to that the terminal is held on the side where the second screen is and is held on the side where the biological detection sensor is, controlling the function display interface to be displayed in a preset portion of the first screen, wherein the preset portion is at least one of a portion adjacent to the second screen and a portion adjacent to the biological detection sensor, determined on a basis of using habits of a user.

* * * * *